No. 623,865. Patented Apr. 25, 1899.
S. H. AYER.
ADVERTISING APPARATUS.
(Application filed Dec. 9, 1898.)
(No Model.)
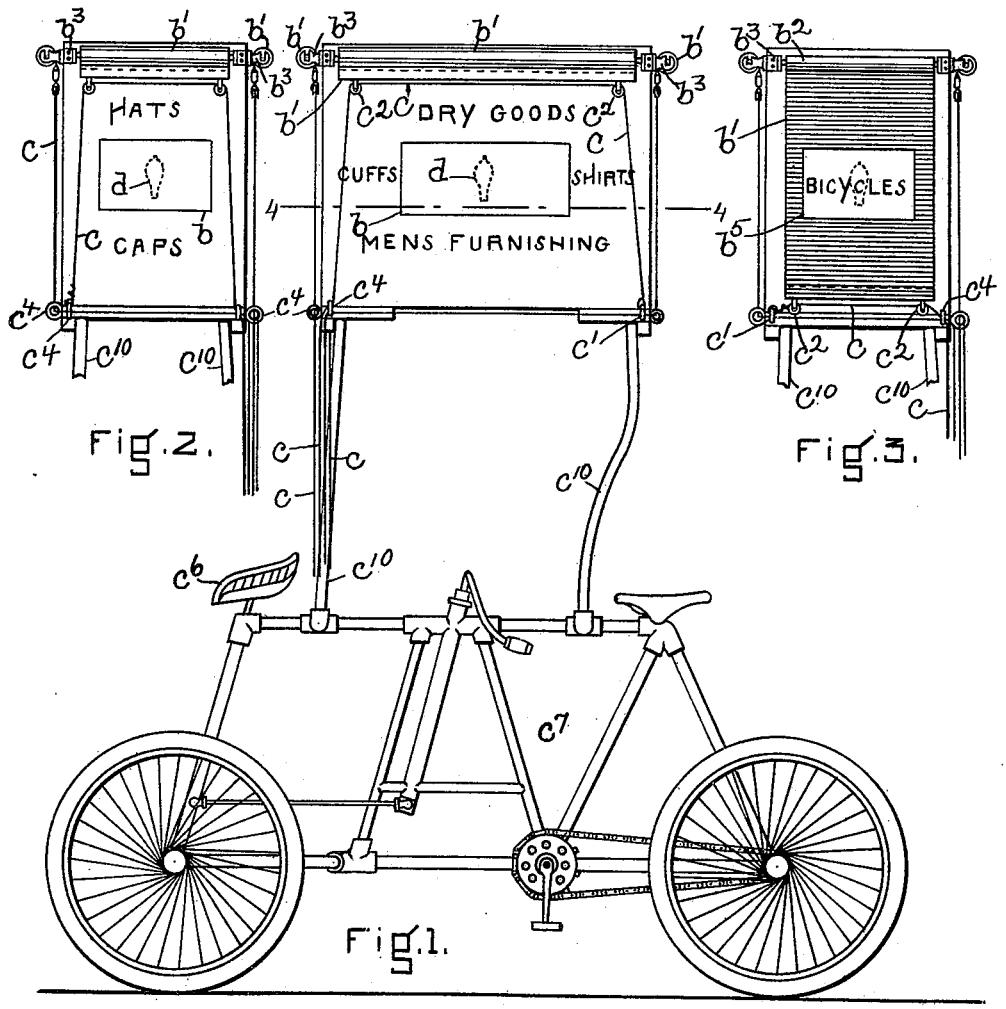
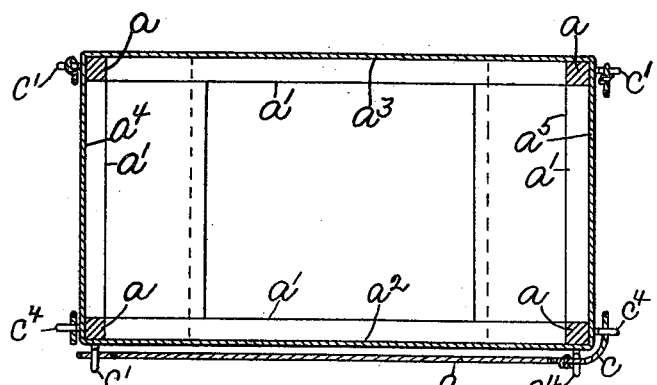
WITNESSES
Matthew M. Blunt
J. Murphy
INVENTOR
Silas H. Ayer
by Jas. H. Churchill
ATT'Y.

UNITED STATES PATENT OFFICE.

SILAS H. AYER, OF BOSTON, MASSACHUSETTS, ASSIGNOR TO THE LIGHTNING-CHANGE ADVERTISING COMPANY, OF MAINE.

ADVERTISING APPARATUS.

SPECIFICATION forming part of Letters Patent No. 623,865, dated April 25, 1899.

Application filed December 9, 1898. Serial No. 698,792. (No model.)

*To all whom it may concern:*

Be it known that I, SILAS H. AYER, a citizen of the United States, residing in Boston, in the county of Suffolk and State of Massachusetts, have invented an Improvement in Advertising Apparatus, of which the following description, in connection with the accompanying drawings, is a specification, like letters on the drawings representing like parts.

This invention relates to advertising or display apparatus, and has for its object to provide an attractive and efficient apparatus for the purpose specified and one which is especially attractive at night-time.

In accordance with this invention I employ a transparent or translucent body or surface having printed or otherwise affixed thereto or thereon one or more advertisements and a second body, opaque in whole or in part, which is adapted to cover the first body, means to remove the said cover substantially in an instant in order to display the advertisement or advertisements, and means to move the cover so as to conceal the advertisement. A plurality of advertisement-surfaces and their coöperating covers may be mounted on a portable apparatus provided with a suitable light for illuminating the advertisement-surface at night, and for the best results the advertisements on the surface are arranged so as to leave an open space, and the cover is provided with an advertisement which is arranged on said cover so as to come into line with the blank or unoccupied space on the advertisement-bearing surface, the remaining portion of the cover which is in line with the advertisements on the rear surface being opaque, so as to conceal the advertisements on said rear surface when the advertisement on the front surface or cover is being displayed, and especially at night. These and other features of this invention will be pointed out in the claims at the end of this specification.

Figure 1 is a side elevation of one form of apparatus embodying this invention, the cover being in its withdrawn position; Fig. 2, an end elevation of the upper portion of the apparatus shown in Fig. 1, the cover being in its withdrawn position. Fig. 3 represents Fig. 2 with the cover down; Fig. 4, a horizontal section of the apparatus shown in Fig. 1, taken on the line 4 4 and with the vehicle omitted.

In the present instance I have shown one form of apparatus embodying my invention, the said apparatus consisting of a substantially oblong frame composed of suitable corner-posts $a$, united by top and bottom cross-connecting bars $a'$, and to the outside of which are suitably secured transparent or translucent surfaces or bodies $a^2$ $a^3$ $a^4$ $a^5$, which may be composed of white textile material, such as cotton cloth. The transparent surfaces referred to are designed to have printed or otherwise affixed to them advertisements of the same or different kind, and preferably each surface will be provided with a different advertisement, as indicated in Figs. 1 and 2.

The advertisement on each of the transparent surfaces may and preferably will be arranged thereon so as to leave a blank space, which in the present instance is shown in Figs. 1 and 2 as a rectangular space $b$ near the center of the said surface.

Each of the transparent surfaces $a^2$ $a^3$ $a^4$ $a^5$ has coöperating with it a movable surface or cover, preferably in the form of a curtain $b'$, provided with the usual spring-operated roll or fixture $b^2$, which is supported in brackets $b^3$, secured to the framework near the top of the same, the said curtain being opaque for the whole or a portion of its surface, and preferably said curtain is left transparent for a portion of its surface, as indicated at $b^5$, Fig. 3, which comes in line with the blank space $b$ of the rear surface, those portions of the curtain which come in line with the advertisements on the transparent surface being painted black or otherwise rendered opaque, so as to conceal them from view when the curtain is in its drawn position.

The transparent space or portion $b^5$ of the curtain is designed to have painted or otherwise applied thereto an advertisement which may and preferably will be different from that on the rear surface.

The curtain may be drawn into its exposed position by a cord $c$, fastened at one end to the lower portion of the framework—as, for instance, to a screw-eye $c'$—and passed over suitable pulleys $c^2$, herein shown as two in number, which are fastened to the lower edge of the curtain, and the cord $c$ may then be passed through a screw-eye $c^4$ at the opposite side of the framework and carried down to the seat $c^6$ on the vehicle carrying the advertising apparatus. It will thus be understood that the operating-cords of all the curtains are designed in practice to run to one point, such as the seat of the vehicle, so that all the curtains may be manipulated by a single operator, who may be the driver of the vehicle.

The vehicle which carries the advertising apparatus may be of any suitable style or character and is herein represented as a bicycle $c^7$ of the tandem type. The framework of the advertising device or apparatus may and preferably will contain within its four walls a light $d$, which may be an incandescent electric lamp, or it may be any other suitable light, it being represented as an incandescent electric lamp, and when the vehicle is driven by electricity—such, for instance, as an electric-motor carriage—the lamp may be lighted by the power employed to propel the vehicle.

The advertising-frame may be secured to the vehicle in any suitable manner, and as represented it is secured to supporting bars or rods $c^{10}$, which are fastened to the frame of the bicycle.

The advertising apparatus is especially attractive at night-time, as the curtain when raised displays the advertisements on the transparent rear surface and when lowered covers these advertisements and displays its own. The advertisements are rendered particularly noticeable by reason of the rapid manner in which they are displayed and then withdrawn from view, for it will readily be seen that the curtain may be raised and lowered substantially in an instant, so that when drawn the advertisement on it is displayed, and when raised this advertisement is withdrawn substantially in an instant and a new advertisement is exposed to view, which in turn is removed from view substantially in an instant when the curtain is drawn.

I prefer to provide the curtain with an advertisement, as it not only provides for greater advertising-space, but renders the advertisements more attractive by reason of the contrast; but I do not desire to limit my invention in this respect, as the curtain may be made dark or opaque for its entire area or surface, and in this case the whole of the rear surface may be utilized for advertising purposes; but this construction or arrangement is not so advantageous as that herein shown and above described.

I have described the curtains as being operated manually in one direction; but I do not desire to limit my invention in this respect, as the curtains may be operated by power.

I have herein shown a single cover or curtain coöperating with each advertising-surface; but, if desired, a plurality of curtains may be used.

I claim—

1. The combination with a vehicle, of an advertising apparatus carried thereby and comprising a supporting-frame provided with a transparent or translucent surface having thereon an advertisement arranged to leave a blank space on said surface, and a curtain adapted to cover and uncover said surface and provided with a dark portion to cover the advertisement on the rear surface, and with a transparent portion having an advertisement thereon which comes in line with the blank space on the rear surface, substantially as and for the purpose specified.

2. An advertising apparatus comprising a framework provided with an advertisement-bearing surface having the advertisement arranged thereon to leave a blank space, and a coöperating surface movable into and out of line with said advertisement-bearing surface and having on it an advertisement or character arranged to come in line with the said blank space when the said surfaces are opposed to each other.

3. An advertising apparatus comprising a framework provided with an advertisement-bearing surface having the advertisement arranged thereon to leave a blank space, and a curtain to cover and uncover said surface and having a dark portion to conceal the said advertisement and a light portion provided with an advertisement or character, substantially as described.

In testimony whereof I have signed my name to this specification in the presence of two subscribing witnesses.

SILAS H. AYER.

Witnesses:
 JAS. H. CHURCHILL,
 J. MURPHY.